(12) United States Patent
Stähli n et al.

(10) Patent No.: US 8,729,857 B2
(45) Date of Patent: May 20, 2014

(54) SYSTEM, DEVICE AND METHOD FOR DATA TRANSFER TO A VEHICLE AND FOR CHARGING SAID VEHICLE

(75) Inventors: Ulrich Stähli n, Eschborn (DE); Enno Kelling, Eschborn (DE)

(73) Assignee: Continental Teves AG & Co. OHG, Frankfurt (DE)

( * ) Notice: Subject to any disclaimer, the term of this patent is extended or adjusted under 35 U.S.C. 154(b) by 396 days.

(21) Appl. No.: 13/123,915

(22) PCT Filed: Oct. 14, 2009

(86) PCT No.: PCT/EP2009/063433
§ 371 (c)(1),
(2), (4) Date: May 20, 2011

(87) PCT Pub. No.: WO2010/043659
PCT Pub. Date: Apr. 22, 2010

(65) Prior Publication Data
US 2011/0215758 A1    Sep. 8, 2011

(30) Foreign Application Priority Data

Oct. 15, 2008  (DE) .......................... 10 2008 051 770
Oct. 15, 2008  (DE) .......................... 10 2008 051 771
Oct. 22, 2008  (DE) .......................... 10 2008 043 059

(51) Int. Cl.
*H01M 10/44* (2006.01)
*H01M 10/46* (2006.01)

(52) U.S. Cl.
USPC .......................................................... 320/109

(58) Field of Classification Search
USPC ............................... 320/104, 109, 128; 701/22
See application file for complete search history.

(56) References Cited

U.S. PATENT DOCUMENTS

| | | | |
|---|---|---|---|
| 2004/0254881 A1* | 12/2004 | Kumar et al. | 705/40 |
| 2008/0136371 A1 | 6/2008 | Sutardja | |
| 2008/0159281 A1 | 7/2008 | Jesseph | |
| 2010/0257475 A1* | 10/2010 | Smith et al. | 715/771 |
| 2011/0087662 A1* | 4/2011 | Darby et al. | 707/736 |

FOREIGN PATENT DOCUMENTS

| | | |
|---|---|---|
| DE | 102005 032495 A1 | 3/2006 |
| DE | 102007 052540 A1 | 7/2008 |
| WO | WO 2008/073453 A | 6/2008 |

* cited by examiner

*Primary Examiner* — Edward Tso
(74) *Attorney, Agent, or Firm* — Brinks Gilson & Lione

(57) ABSTRACT

A data transfer, power supply and charging apparatus having a data interface transfers both energy to an energy storage device and vehicle- or driver-related data via a charging cable or electric line. The use of a charging cable for transmitting data to and from the vehicle is suitable particularly for electric and hybrid vehicles in the automotive sector. In this way, it is possible to perform updates for vehicle-internal systems and to check these. In addition, the data transfer, power supply and charging apparatus may include a communication unit which also allows data to be received and sent during travel without an electrical connection.

11 Claims, 4 Drawing Sheets

SYSTEM, DEVICE AND METHOD FOR DATA TRANSFER TO A VEHICLE AND FOR CHARGING SAID VEHICLE

CROSS REFERENCE TO RELATED APPLICATIONS

This application claims priority to German Patent Applications No. 102008051771.2, filed Oct. 15, 2008, 102008051770.4, filed Oct. 15, 2008, and 102008043059.5, filed Oct. 22, 2008, as well as International Patent Application No. PCT/EP2009/063433, filed Oct. 14, 2009.

FIELD OF THE INVENTION

The invention relates to data and energy transfer for vehicles via communication or power supply systems. In particular, the invention relates to a data transfer, power supply and charging apparatus for a vehicle, to a vehicle-external data transfer and charging station, to a method for transferring data to a vehicle and for charging the vehicle, to a computer program product and to a computer-readable medium.

TECHNOLOGICAL BACKGROUND

Vehicle systems are known which provide various kinds of data for vehicle drivers or service employees. If a vehicle system needs to be updated, for example in order to provide additional or corrected data, the required data are usually transferred to the vehicle system using an interchangeable medium, for example a compact optical data storage medium such as a CD-ROM or DVD. By way of example, a navigation system in the vehicle can resort to said interchangeable medium as an onboard map (digital map). However, digital maps, in particular, are frequently quickly outdated, which means that it is necessary for an interchangeable medium to be replaced by a new, updated medium if the data need to match the present circumstances. Update devices for creating and updating digital maps in a vehicle on the basis of wireless data transfer are described in DE 10 2008 011 290 A1 and DE 10 2008 012 654 A1, for example.

SUMMARY OF THE INVENTION

It is an object of the present invention to simplify the servicing of vehicles.

This object is achieved by a data transfer, power supply and charging apparatus for a vehicle, a vehicle-external data transfer and charging station, a method for transferring data to a vehicle and for charging the vehicle, and by a computer-readable medium on which a program is stored that instructs a processor to perform the method.

In accordance with one exemplary embodiment of the invention, a data transfer, power supply and charging apparatus for a vehicle having an energy storage device, a control apparatus and a data interface is provided, wherein the data interface is designed to receive vehicle-related data and at the same time charging current for the energy storage device of the vehicle via an electric line (or a line pair) in the vehicle and to transfer the data to the control apparatus.

This apparatus using a charging cable, for example, which simultaneously acts as a data transfer cable, allows very simple and uncomplicated data transfer. The combination of a data interface and a connection point for power allows a reduction in the number of interfaces for a vehicle.

The transfer of data via electric lines, subsequently also called powerline communication, can be effected as follows:

data signals are modulated onto a standardized frequency (for example 50 Hz) of a power line as radio-frequency and audio-frequency signals. By way of example, the data transfer can be provided at carrier frequencies in the MHz range, for example between 1 and 30 MHz. This communication technology can be used to make multiple use of existing lines or power lines without needing to use new cables. The use of the charging cable as a communication channel for the data transfer for vehicle-related data means that other costly techniques are dispensed with and it is not necessary for antennas to be fitted to the vehicle in order to support wireless techniques. This simplifies the servicing of the vehicle systems.

A control apparatus such as a computation unit can be used to convert the communication data received via the data interface into a conditioned format, so that they are easier for a vehicle driver to understand. By way of example, one conditioned form would be that only problematical values are presented or an error status is displayed to the driver, so that he is prompted to drive to the closest service station with suitable personnel.

In accordance with a further embodiment of the data transfer, power supply and charging apparatus, the energy storage device of the vehicle comprises a battery for operating an electric motor.

Vehicles which use an electric drive, such as purely electric vehicles or plug-in hybrid vehicles, can in this way be connected to the power supply system using a charging cable, the cable being able to transfer not only the charging current but also data to the vehicle or from the vehicle. This allows data transfer to take place additionally during the charging time. In this case, it must be assumed that the vehicles are connected to the charging cable for a relatively long time in order to ensure that the battery is fully charged. On account of the long charging times, it is also possible to transfer relatively large amounts of files to the vehicle. The use of the power line or the electric line ensures that power is supplied during the update or the updating of the data at all events. A further advantage is that transfer costs of the data can be estimated to be lower in comparison with wireless communication.

Vehicles with an electric drive require an appropriate charging infrastructure, wherein a charging connector with a charging cable can be connected to the vehicle and the other end of the charging cable can be plugged into an external charging socket. For the domestic sector, charging cable connections in which the electric car or plug-in hybrid can be charged using a standardized 230 V socket are suitable. Depending on the field of use, the charging powers or the charging currents can be varied. Since an energy storage device can usually be charged using an electric line, this technique is essentially decoupled from the fast development cycles which are customary in mobile communication technology. This allows use to be made of the advantage of the charging cable and the associated interfaces that they are independent of the fast development on the private market.

The data transfer, power supply and charging apparatus can be used to provide the communication interfaces which are required for the respective vehicle which is compatible with the standard plug-in apparatuses in an available infrastructure for the public power supply systems. The use of simultaneous energy and data transfer allows both monitoring and communication in and from the vehicle, and it is possible to install billing systems, for example, which can store electricity consumption.

In accordance with a further embodiment of the invention, the data transfer, power supply and charging apparatus comprises a display apparatus for displaying the transferred data.

This allows the driver to be shown vehicle-related data, such as the charge status of the battery or the update status of the vehicle system components which are to be updated. An interactive display apparatus can also be used to select individual components which need to be updated. A selection signal which is sent to the data transfer, power supply and charging apparatus allows a component to be selected and to be available for data reception or retrieval. The display can be viewed by the vehicle driver or a trained service employee and used for evaluating the data. In this case, the interface of the data transfer, power supply and charging apparatus can be used to transfer diagnosis data which can be made available to a service operative without conditioning.

In suitable workshops and filling stations, the service staff can check the data displayed using the data transfer, power supply and charging apparatus and can provide the driver with a recommendation following further analysis. By way of example, this would allow a filling station to provide the service of analyzing such data for the driver and of outputting appropriate recommendations. Such provision of service would allow the filling station or an appropriate workshop with the trained personnel to extend its range of services and possibly increase its turnover.

Beside the option of communication via the charging cable and using powerline communication, a further extra cable is also possible for transmitting diagnosis data. In addition, the data could also be transmitted wirelessly via a remote diagnosis or telematics unit. It is thus possible for the data to be transferred from the vehicle in a plurality of ways, and the vehicle driver and the respective service personnel can select the suitable variant and least expensive variant.

If the vehicle is charged using a power cable, that is to say a power line, then the data for vehicle diagnosis can be transferred and displayed at the start of the charging process. In this way, the driver immediately knows what the status of his vehicle is. The data are stored and displayed again when the charging process is terminated or interrupted. The stored data can be retrieved by the driver or service personnel at any time on request.

In accordance with a further embodiment of the invention, the data are selected from the group comprising vehicle diagnosis data, updates for internal vehicle systems or software, safety data and entertainment data.

A single line (or line pair) which can be connected to any vehicle component or system via a central control apparatus by a single power cable, for example, therefore allows several types of data, such as vehicle diagnosis, software updates or safety data, to be transferred via a power line. This simplifies the system and makes it less expensive. The use of just one common line for different data saves an interface or cable run, respectively.

The provision of vehicle diagnosis data allows optimum checking and diagnosis for the vehicles. With the increase in electrical and electronic vehicle components, particularly in the automotive industry, it is important always to be able to provide the vehicle with the up-to-date manufacturer, hardware and software systems in a simple manner. The data transfer, power supply and charging apparatus can be used to perform diagnosis and analysis for or to update both single applications, which frequently enter the market as a new development, and system applications, which link multiple components and modules. By way of example, crash sensors, and electronic stability program (ESP) or applications such as engine control components, which perform safety functions, can be read using the data interface of the data transfer, power supply and charging apparatuses. If the analysis reveals a safety-relevant status, this can immediately be reported to the driver using the display apparatus. One possible function of the control apparatus would be an excessively low oil level in the engine, for example, prompting initialization of an immobilizer in order to prevent subsequent damage by continued driving. Service staff can, in the same way, be provided with much more precise information than is necessary for the driver. In this case, by way of example, the information from error memories, such as in the ESP or in the engine controller, or version levels of software modules can be made available. Similarly, the service staff member can be notified of self-diagnosis of the vehicle if a driver stops by on account of a problem with his car or even preventively at a "filling station".

In addition, the control apparatus can be set such that wireless transfer of the data is also possible. In this case, the control apparatus would be able to be used to download the updates from the external server only after a parked mode has been identified or after a handbrake has been engaged.

If a drive concept such as a plug-in hybrid is being used, it is also useful to transfer the data collected in the vehicle to the outside, for example in order to be able to make the optimum setting on the hybrid drive using a software update in line with the respective way of driving or to allow the manufacturer to perform further optimization.

Whenever data are transferred to the outside, the privacy of the driver needs to be protected. It is therefore necessary to anonymize the data or to make them directly associate able with the vehicle only if the driver has explicitly consented to this. The methods required for this purpose are sufficiently well known from the information and are used in mobile radio, for example.

As a further data group, the data transfer, power supply and charging apparatus can be used to provide updated data. Particularly in the case of infotainment applications, such as navigation, audio system, connection of mobile appliances, etc., in which updates are frequently required for internal vehicle systems or software, it is important that the latest updates are always available in the vehicle. This allows the functionality of the vehicle to be ensured in optimum fashion. The use of the charging cable as a transfer medium means that no additional communication costs are incurred and the update can take place fully automatically if the charging cable has been connected. Particularly in the case of updates for operating software or for component software, it is important for the data to be protected using a suitable safety mechanism in this case so that only authenticated and authorized software can be transmitted to the vehicle.

A further data group which can be cited are the safety data themselves, which are required in order to safeguard communication in the case of vehicle-to-vehicle communication, for example. Using or on the basis of car-to-car communication, the vehicle driver or the relevant computer in the vehicle can communicate with other vehicles and hence be connected to continually updated databases. A further possible form of communication is vehicles communicating with infrastructure devices, for example with sign gantries over highways. The infrastructure units can collect data from passing vehicles and transfer traffic information to the vehicle, said traffic information then being able to be forwarded to the driver assistance system. At short range, it is possible to use the wireless LAN standard, for example, for this communication, said standard complementing traditional communication channels such as DAB and UMTS.

However, vehicle-to-vehicle communication needs to be protected by a method based on a public key infrastructure (PKI), for example. This requires keys and certificates which are transmitted to the vehicles from a central data point for the purpose of communication. This can be done using the data interface of the data transfer, power supply and charging apparatus, for example.

In this way, the driver may also find necessary information for his navigation appliance, for example. Since a fixed charging station is not suitable in the case of location-dependent information about traffic disruptions of all kinds, for example, it should additionally be possible to resort to a wireless communication network.

A further data group which is suitable for transfer using the charging cable or the power line with the power is entertainment data. Particularly because large volumes may arise in this case, a mode of transmission using the power line is advantageous in this case. Possible entertainment-related data would be music lists and pieces of music for vehicle-internal music systems, for example. In addition, it is also possible to use the data interface to send pieces of music from the vehicle to the external station. If the vehicle has a TV or video transfer apparatus, it is also possible to transfer video or DVD data to the vehicle. In addition, it is possible to provide games or similar entertainment applications via the power line for passengers, for example.

In accordance with a further embodiment of the data transfer, power supply and charging apparatus, the location-related data which are transferred relate to a predefined environment of the vehicle.

This has particular significance for data which are used for the navigation system. By way of example, routes and map data for the navigation system can be updated exclusively only within a radius of 50 km around the vehicle location. If the vehicle leaves this specified radius, the data can be performed during the journey using a second further communication channel, which is wireless. This allows optimum use to be made of the memory in the navigation system. In this case, updates which are necessary at the present location can be loaded from the server via the data interface of the data transfer, power supply and charging apparatus.

In accordance with a further embodiment of the data transfer, power supply and charging apparatus, the data transfer, power supply and charging apparatus has a communication unit, wherein the data which are needed during the journey can be received by the communication unit by means of a wireless communication. In this case, the communication network is selected from the group comprising wireless LAN networks, GPRS networks, UMTS networks, LTE networks and/or WiMax networks and also further possible types of communication, such as Bluetooth communication, ZigBee communication, NFC communication, etc.

If it has not been possible to transfer necessary updates to the vehicle during the charging process, the further communication unit can be used to transmit the data to the vehicle, for example using GPRS, as soon as this is necessary. GSM/GPRS networks can be used to allow the processing of internal vehicle data or else vehicle localization using GPS. Wireless data transmission and remote querying of the provider connected to the charging station allow the vehicle driver to retrieve the necessary data even in remote areas, provided that the communication unit installed in the vehicle is consistent with and can make contact with the available local area network.

In accordance with a further embodiment of the data transfer, power supply and charging apparatus, the safety data being encryption algorithms for applications, the applications being selected from the group comprising vehicle-to-vehicle communication, vehicle-to-infrastructure communication, operating software and component software.

In the case of vehicle-to-vehicle and vehicle-to-infrastructure communication, it can become necessary to set a server address and data formats, for example, with authentication and the sending of keys and certificates being required. One condition for communication setup to other vehicles or the central server may be once-defined or changing encryption in order to increase the safety of the vehicle-to-vehicle communication.

In addition, safety and encryption algorithms for operating software and component software are necessary in order to transfer only authorized operating software to the vehicle. In this way, a suitable safety mechanism is implemented so that only authenticated and authorized software is transmitted to the vehicle. The encryption is also an option for transferring safety-relevant data, where the vehicle driver does not wish the transferred data to be able to be accessed externally.

In accordance with a further exemplary embodiment of the invention, the data transfer, power supply and charging apparatus has an energy storage device in the vehicle which can be read externally when the energy storage device is interchanged.

This makes it possible to dispense with a charging cable for data transfer and energy transfer, since in this case, the exhausted battery is being interchanged with a fully charged one. In this practice of supplying the electric drive with new energy, there is the option of storing vehicle-related data in the battery. When the battery is being interchanged, it then becomes possible to briefly read the used battery and to display and evaluate these data. The new battery may already contain new software updates on the internal memory and can therefore be transferred to the vehicle. In this case, the updates may include updates for the operating software or for component software, and the assurance should be provided, by means of suitable safety mechanisms, that only authenticated and authorized software is transmitted to the vehicle. In addition, it is necessary to ensure that the data on the old battery are protected against unauthorized access and are automatically erased from the vehicle following a stipulated time after removal, for example.

In addition, a vehicle-external data transfer and charging station for transferring data to a vehicle via an electric line and simultaneously charging an energy storage device in the vehicle via the electric line is provided.

In this case, the vehicle-external data transfer and the charging can each be effected using a separate cable. A combination line as in the case of powerline technology is advantageous, however, in order to be able to save a cable and also interfaces or connectors. The external data transfer and charging station may comprise a server, for example. In this case, the server is connected to a provider which is able to provide the update data which are needed. In this way, the most up-to-date update is always on the server and can be transferred to the vehicle as soon as the vehicle needs to be charged. The provider can also be used to allow wireless transmission of updates which have not been installed to the vehicle later during the journey if the suitable communication unit has been installed in the vehicle. The external data transfer and charging station is also designed to convert the data into a format which is suitable for transfer using a power line.

In accordance with a further embodiment of the data transfer and charging station, the station comprises a server in a home network or company network.

The selection of a home or company network is an option, since the vehicle will usually very often be positioned close to these networks. During parking or relatively long switched-off times, the charging process can be used in order to transfer updates to the vehicle or to download vehicle data.

Since a plurality of vehicles are connected to the power supply system in a company, it is necessary in this case for the vehicle to register once in the system so that the company server knows which update needs to be kept for which vehicle. The updates vary according to vehicle type and desired constraints which are specifically set in navigation systems, for example. If a plurality of vehicles use the server in a home network, one-off registration is necessary in this case too, and this information is stored in the data transfer and charging station and it is then not necessary to register in the system again.

In addition, it is also possible for these updates to be able to be performed using a wireless LAN if the company or private car does not have an electric drive or the battery storage device is already fully charged. The home or company server can in this way be used to buffer the update data. The use of a home or company server as a buffer for the update allows communication costs to be significantly lower and makes it possible to ensure that the updates are transferred to the vehicle. When a vehicle is started, it can check whether it is in the local area radio network, such as a wireless LAN, and is therefore able to download the possibly required updates via the server. Since the range of a wireless LAN is limited, data which have not been able to be loaded during the switched-off or starting time of the vehicle can be transferred by means of the provider using another wireless technology with a greater range, which is sometimes subject to cost.

In accordance with a further embodiment of the invention, a method for transferring data to a vehicle and charging the vehicle is specified, comprising the following steps:

An electric line is connected to a data interface for data transfer and for charging an energy storage device in the vehicle. The charging process for the energy storage device begins and at the same time vehicle-related data are transferred via the electric line to a control apparatus, and the transferred data are stored on a memory element in the vehicle.

This method is suitable for plug-in hybrid vehicles or pure electric vehicles which have an energy storage device or a battery for an electric drive. In the case of the pure electric vehicles, it is necessary for the energy storage device to be charged regularly. This usually requires several hours. Said method can be used to make use of this charging time in order to use the electric line or power line to transfer not only power or energy but also data. This makes it possible to save cable and also interfaces in the electrically driven vehicle.

The interface for data transfer and simultaneous charging can be initiated for the data transfer at the beginning of the charging process. In this case, it is first of all possible to download data from the vehicle in order to check the status of the various vehicle systems. Next, alignment with the data on the server can take place, and if this alignment reveals necessary updates for the data then said data can be transmitted to the vehicle via the data network or the power line. The data are converted into a format which is compatible with powerline communication and are then modulated onto the standard frequency of the power line using a particular frequency.

The data transferred from the server via the power line can be received in a control apparatus for the data transfer, power supply and charging apparatus of the vehicle and, there, can again be converted to a format which is suitable for the vehicle-internal systems. In addition, the transferred data are stored and can be displayed to the driver on request. In this case, the data may have been previously sorted, so that only relevant safety data are reported to the driver. In another mode, it is possible for the service personnel to view the unsorted data in order to be able to make a detailed diagnosis of all of the collected data. The data can be stored on the internal onboard computer, for example.

In accordance with a further embodiment of the production method, prior to the data transfer, the vehicle-external data transfer and charging station checks whether it is necessary to update the data. In addition, incomplete data transfer will prompt forwarding from the external data transfer and charging station to the provider in order to be able to provide the vehicle with the data during the journey via at least one wireless communication network in the vehicle. In addition, the stored data can be displayed to the user.

In this way, the data to be transferred can be reduced and it is possible for only selected data which are considered necessary to be transferred to the vehicle. There is also the assurance that incomplete data transfer prompts the provider to be informed in order to provide an option allowing the remaining as yet undownloaded data to be subsequently transferred to the vehicle during the journey by means of wireless communication.

In accordance with a further embodiment of the invention, the data transfer, power supply and charging apparatus is used in a vehicle.

This may involve water vehicles, rail vehicles, air vehicles or motor vehicles. Particularly in the automotive sector, in which electrically driven motor vehicles or hybrid solutions will probably increase, the use of the data transfer, power supply and charging apparatus is a simple solution—and one which is independent of fast development cycles in communication technology—for transferring data and energy simultaneously.

In accordance with a further exemplary embodiment of the invention, a program element is specified which, when executed on a processor, instructs the processor to perform a method for transferring data to a vehicle and for charging an energy storage device in the vehicle.

In addition, in accordance with a further embodiment of the invention, a computer-readable medium is specified which stores the program element which, when executed on a processor, instructs the processor to perform the method steps described above.

It should also be pointed out that the above features and method steps can also be combined. The combination of the above method steps and features can lead to reciprocal effects and actions which go beyond the individual actions of the relevant features, even if this is not expressly described in detail.

Exemplary embodiments of the invention are described below with reference to the figures.

DETAILED DESCRIPTION OF THE DRAWINGS

Figure 1:
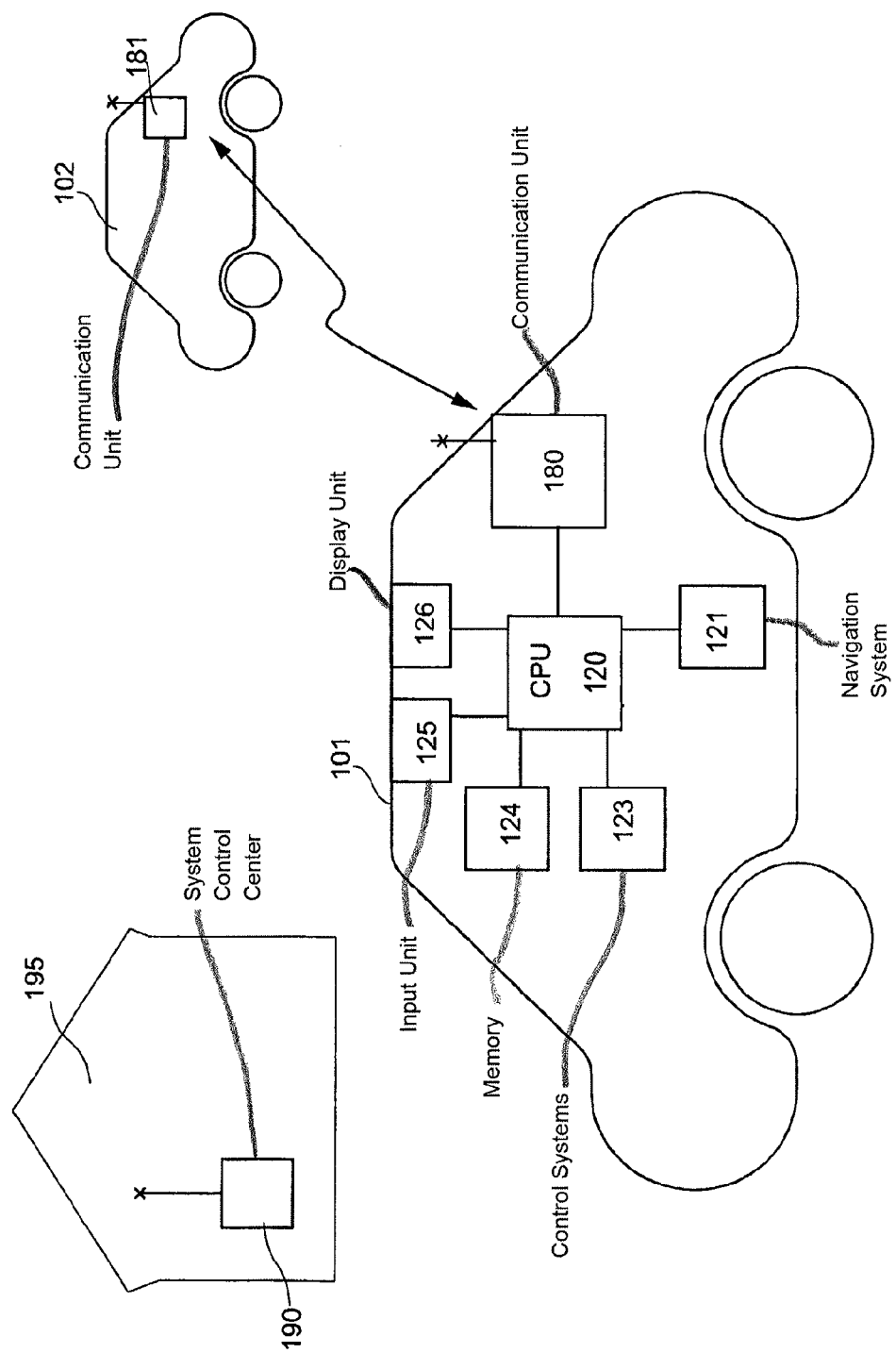
FIG. 1 shows a schematic illustration of a motor vehicle system with a plurality of components, particularly a communication unit for wirelessly transferring data.

FIG. 1 shows a schematic illustration of system components of a motor vehicle 101 with a central computation unit 120 which contains memory elements required for it to operate and a further memory 124, for storing data. In addition, the computation unit or CPU 120 is connected to a communication unit 180. The communication unit comprises a transmission and reception unit, such as an antenna, in order to be able to receive the data wirelessly via a radio link, for example from a further vehicle 102. The vehicle 102 for its part has a communication unit 181 which is compatible with the communication unit 180. In order to be able to setup communication between the vehicle 101 and 102, it is possible to resort to a communication network, for example, such as a mobile radio network, or direct vehicle-to-vehicle communication can take place, e.g. on the basis of the C2C-CC or ETSI standard.

The data for the data transfer are provided by a system control center 190, for example by a suitable provider in a company 195, by a suitable server. This allows up-to-date versions of navigation maps, for example, to be transmitted to the vehicle and then transferred to the navigation system 121 via the computation unit 120.

For the data transfer between two cars in transit, it is important, by way of example, to be able to transfer vehicle sensor data such as speed or the state of the hazard lights via the communication network in order to be able to recognize a stationary car ahead of time. In order to be able to allow vehicle-to-vehicle communication, it is also necessary to transmit keys and certificates to the vehicles from the central station 190 prior to communication setup. Following secure registration in the system, the control center 190 can provide every single individual vehicle with an individual update if such an update is required.

Further components of the overall vehicle system are control systems 123, for example, such as the controller for the engine. Further components for providing an interface for the vehicle driver are the input unit 125 and the display unit 126. In this context, it is also possible for the relevant data to be transmitted to the vehicle driver using a loudspeaker too. In addition, the input unit 125 and 126 can be combined if it is a touch screen, for example. Further, other systems or components not cited hitherto can be connected to the central unit (central processing unit or CPU) 120, such as the controller for the lighting system, the controller for the windows or sunroof with anti-jam protection and also crash sensors, the electronic stability program or distance sensors. Error and advice messages such as "cooling water level too low and cooling water consumption calculated during the last trip" can then be displayed to the vehicle driver. This allows possible leaks or other malfunctions in the vehicle to be reliably detected and a service station to be visited if necessary.

Figure 2:
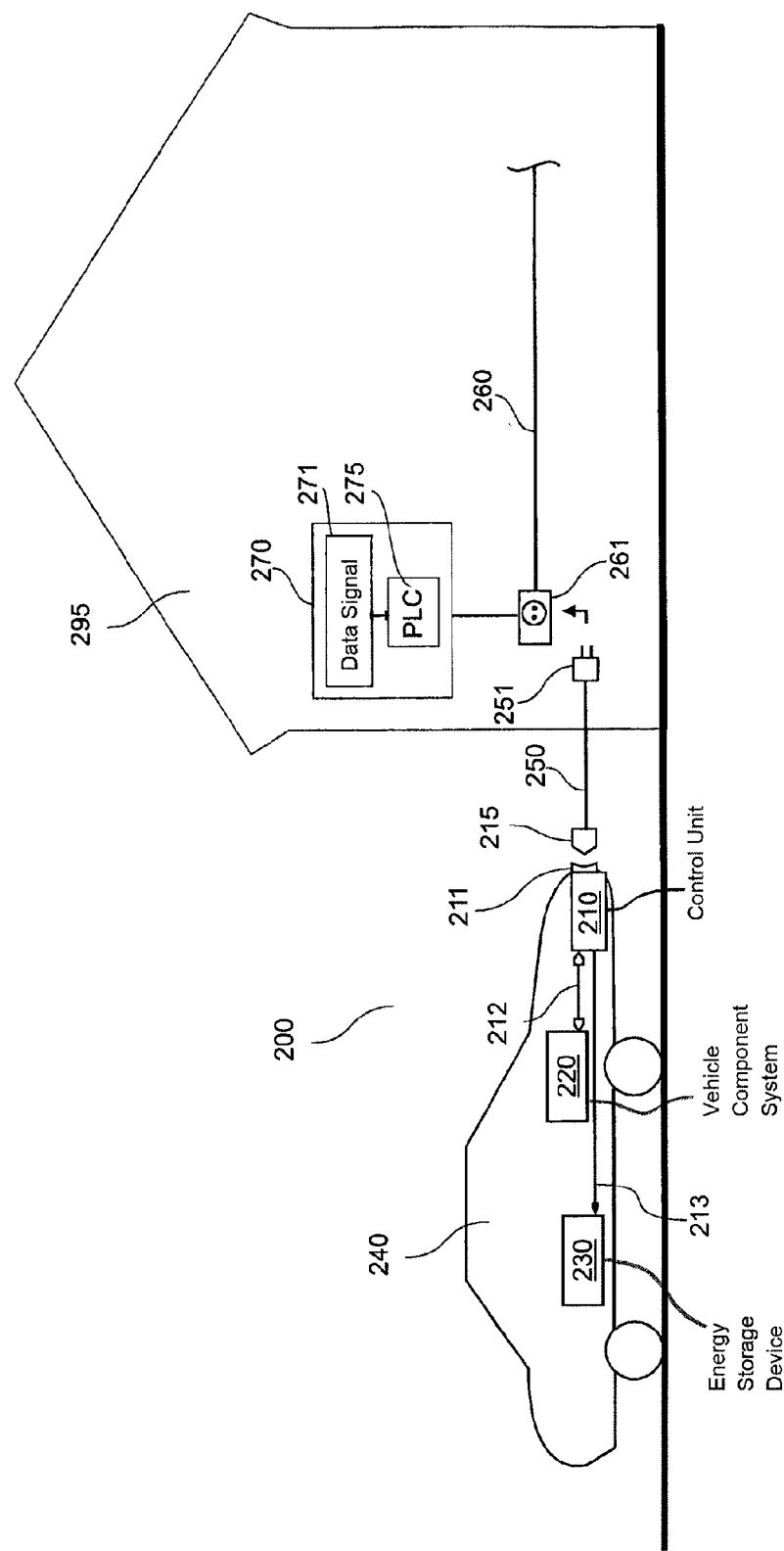
FIG. 2 shows a schematic illustration of a data transfer, power supply and charging apparatus for a motor vehicle using an electric line.

FIG. 2 shows a schematic illustration of a data transfer, power supply and charging apparatus 200 for a vehicle. The vehicle 240 may either be a hybrid plug-in vehicle or a pure electric vehicle which is driven with an electric drive and an associated energy storage device 230. The data transfer, power supply and charging apparatus 200 comprises a data interface 211. The data interface 211 is connected to a control unit 210. The control unit 210 is connected to the energy unit 230 of the motor vehicle, for example a battery, by means of the connecting line 213. The connecting line 212 for its part connects the vehicle component system or the onboard computer 220 as a central unit for all vehicle systems. The various components which can be connected to the system 220 have already been shown in FIG. 1 using the reference symbol 120.

The motor vehicle 240 can be connected to an electric connection 261 by means of a suitable charging cable 250 for the purpose of charging its battery 230. To this end, the data and energy interface 211 is connected to a suitable plug connection 215 on the charging cable 250, and the plug connection 251 on the charging cable is plugged in to a suitable power supply system connector 261. This power connection point 261 is connected to a power supply system by means of the line 260 and can therefore supply the motor vehicle 240 with power in order to charge the energy storage device 230.

The control apparatus 210 can convert the data from the powerline format and forward them to the CPU 120, for example. The control apparatus can also forward the received frequencies to the suitable receivers, so that the energy storage device 230 is only supplied with energy for as long as the battery 230 is not full.

In addition, the connector 261 has a server 270 connected to it which has a computation unit for converting data signals 271 into data 275 which are compatible with powerline communication. In addition, said server is also designed to convert the data from the vehicle 275 which has been downloaded from the electric line 250 back into a data format 271 which is suitable for the computation unit. The data can be transferred by virtue of a higher frequency, for example, being modulated onto the standard frequency of 50 Hz of the power line. The server 270 may in turn have a connection to a provider in order to be able to download data required by said provider, such as updates for vehicle systems. By way of example, the location of this power connection point 261 may be the home of the vehicle driver 295 or his workplace or else a public electric filling station which provides the service of charging with simultaneous data transfer.

If the electric or hybrid vehicle 240 is connected to the power supply system 260 by means of the cable 250, data interchange can take place in both directions, that is to say that it can be used for download and upload. In this case, it is also possible to download entertainment data or pieces of music, or updates of the navigation system which relate particularly to the relatively close environment, for example within a radius of 100 km of the current locality. Once the charging station has been connected to a service unit, such as a filling station with a workshop, suitable technicians can also use the data transfer to carry out diagnosis on the read data for the vehicle driver and to provide him with any recommendations for immediate repairs. In this embodiment of the invention, it is not necessary for any antennas to be fitted to the vehicle, since the vehicles can interchange their data via the charging cable 250. Since charging can sometimes take a long time, it is also possible for relatively large volumes of data to be transferred to the vehicle. A connection to the internet is also possible, in order to allow emails and any attachments to be downloaded, so that the vehicle driver can call up the latest messages on his onboard computer.

Figure 3:
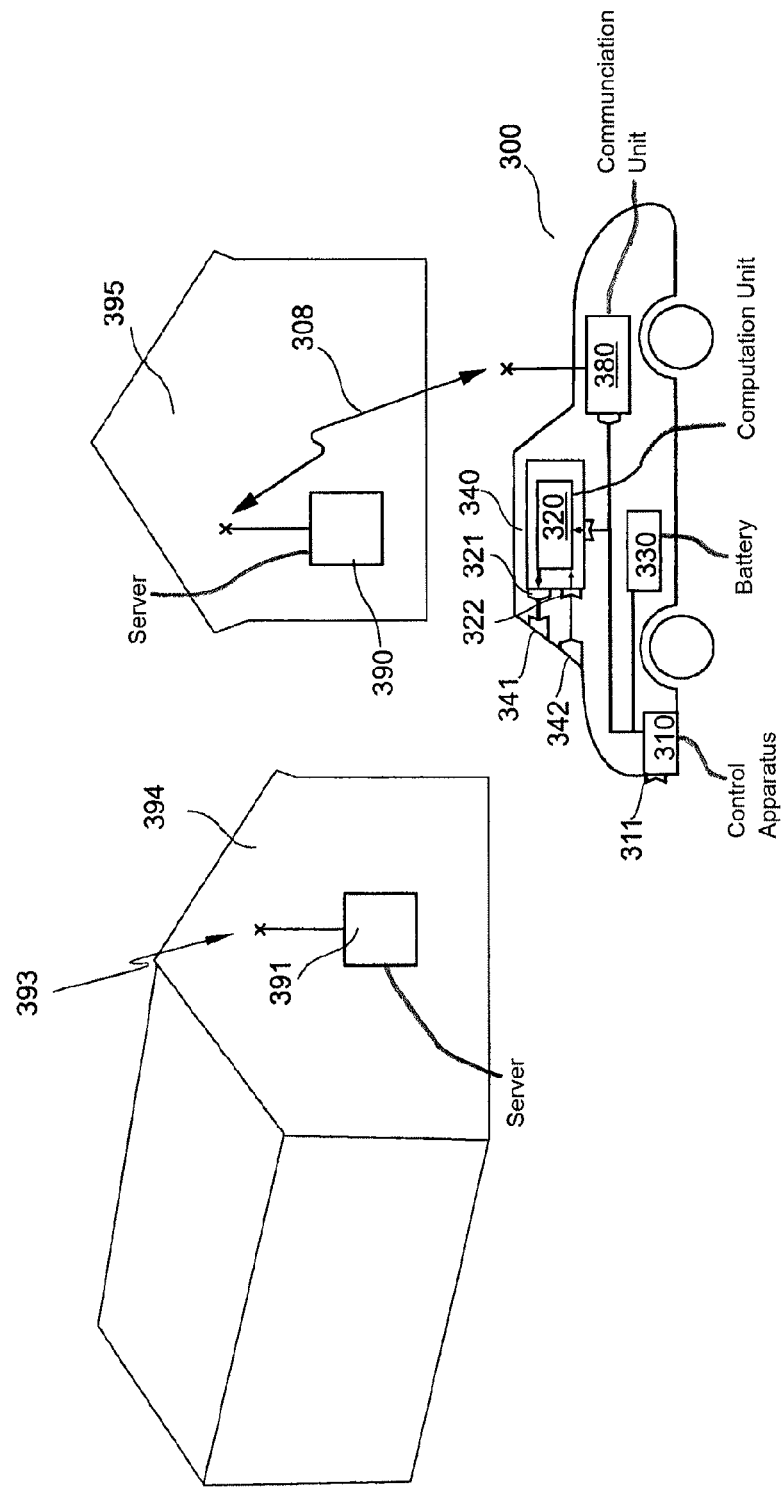
FIG. 3 shows a schematic illustration of a motor vehicle with two data interfaces for receiving data from a home or company network.

FIG. 3 shows a schematic illustration of a further embodiment of the data transfer, power supply and charging apparatus 300. In this case, the motor vehicle 340 has both an electric drive and a communication unit 380 for wireless data transfer. The wireless data transfer 308 can be performed by radio, for example, illustrated by the arrow 308. The radio link or wireless LAN communication can be effected using various local servers 390, 391. In this case, what is shown here is a home network in a household 395 with a server 390 and also a company network with a server 391 which is stationed in the office building 394. The server unit can receive data from the outside either by means of wireless communication 393 or via another network, such as a wired internet connection.

Before a vehicle 340 can send and receive data, registration in the respective network is necessary. Once the vehicle driver has registered his vehicle 340 in the respective network, home or company network, the required data can then be transmitted to the vehicle. The communication unit 380 can then forward the data to the central computation unit of the vehicle 320, which has an interface 321 for transferring data to the vehicle. In addition, the computation unit 320 has an interface 322 for receiving data from the vehicle. Various systems can be connected in order to receive necessary updates, for example, from the vehicle via the interface 341. The respective vehicles systems which need to be checked or monitored or else are only intended to be provided with further volumes of data, such as the internal vehicle music systems, have a respective interface for receiving 341 and for sending 342.

When the vehicle stops at a charging station, the battery 330 can be charged by means of the interface 311 via the associated control apparatus 310. If the visited charging station is setup remotely from the respective home or company network and is a service station, it is also possible to resort to simultaneous data transfer using the power cable. Service staff at a filling station charging station equipped in this manner can in this way produce vehicle diagnoses in return for payment. In this case, the control apparatus 310 is used to convert the data received via a power line to formats which can be provided for the vehicle-internal systems.

Figure 4:
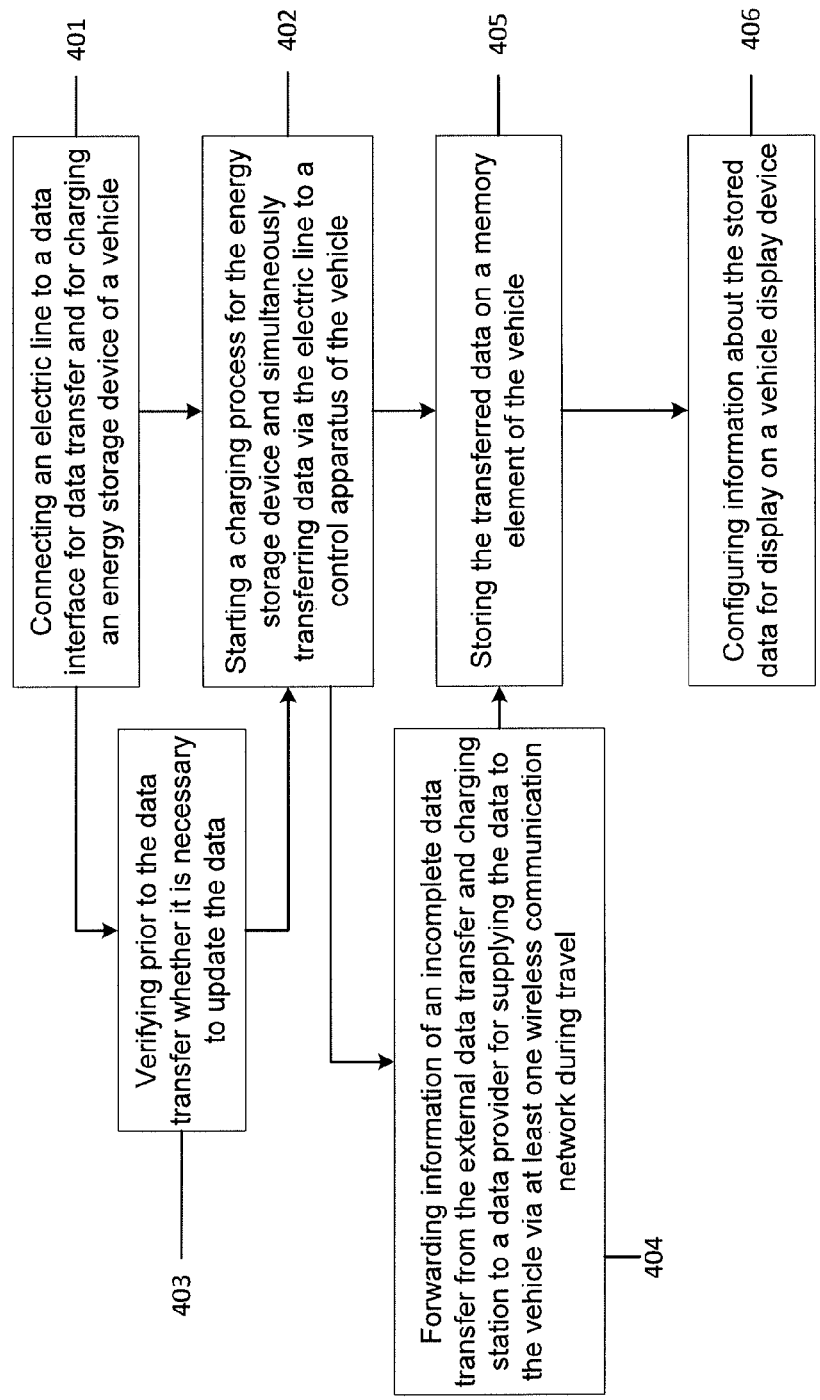
FIG. 4 shows a flowchart for a method according to an exemplary embodiment of the invention.

FIG. 4 shows a schematic flowchart of the method steps for a method for transferring data and charging for a vehicle. The first method step 401 comprises connecting an electric line to a data interface for data transfer and for charging an energy storage device in the vehicle. The electric line may be a charging cable which can be used to transfer data by means of modulation of a relatively high frequency. In the first method step 401, the status of the vehicle should be transferred to the external charging and data station in order to identify the current status of the vehicle-internal systems.

When the charging cable has been connected, the subsequent method step 402 may involve the charging process for the energy storage device starting and simultaneous transfer of driver- or vehicle-related data to the control apparatus taking place. If data are required from the external charging station on request, for example, such as downloading a particular music file, the transfer of the data to the vehicle can start as soon as the cable is connected. The driver can prompt the transfer of selected files using a suitable display and input unit.

In method step 403, prior to a data transfer to the vehicle, the vehicle-external data transfer and charging station can check whether the data need to be updated. This first of all requires transfer of the vehicle data to the external data transfer station in order to align the vehicle status with the stock of data in the data transfer station. It is thus possible to reduce the volume of data to be transferred. By way of example, if the navigation system requires only an up-to-date map within the radius of 50 km of the charging site, this selection can be transmitted to the vehicle.

If the charging process is terminated prematurely or the charging time is not sufficient to transfer all volumes of data completely, it is possible to ensure in step 404 that incomplete data transfer prompts the external data transfer and charging station to be forwarded to the provider in order to be able to provide the data in the vehicle during the trip using at least one wireless communication unit.

In addition, a method step 405 involves the data which have been transferred to the vehicle being stored in a memory element in the vehicle. By way of example, said memory element may be located in a vehicle computation unit or CPU or in the control apparatus. In the last step 406, the stored data can be displayed to the user. This can be done during the trip or else while the vehicle is in the parked state.

It should be noted that the term "comprising" does not exclude further elements or method steps, in the same way the term "a" or "an" does not exclude multiple elements and steps. The reference symbols used serve merely to increase comprehensibility and are in no way intended to be regarded as restrictive, the scope of protection of the invention being reproduced by the claims.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A data transfer, power supply and charging apparatus for a vehicle, comprising:
   an energy storage device;
   a control apparatus; and
   a data interface which is configured to receive vehicle-related data and at the same time charging current for the energy storage device of the vehicle via an electric line and to transfer the data to the control apparatus, wherein the data include at least one member of the group consisting of internal vehicle software updates and entertainment data.

2. The data transfer, power supply and charging apparatus as claimed in claim 1, wherein the energy storage device of the vehicle comprises a battery for operating an electric motor.

3. The data transfer, power supply and charging apparatus as claimed in claim 1, further comprising a display device for displaying the transferred data.

4. The data transfer, power supply and charging apparatus as claimed in claim 1,
   wherein the data further comprise at least one member the group consisting of:
      vehicle diagnosis data and
      safety data.

5. The data transfer, power supply and charging apparatus as claimed in claim 1,
   wherein location-related data are transferred that relate to a predefined environment of the vehicle.

6. The data transfer, power supply and charging apparatus as claimed in claim 1, further comprising:
   a communication unit configured to receive data during travel via a wireless communication network.

7. The data transfer, power supply and charging apparatus as claimed in claim 1,
   the apparatus being configured to receive safety data comprising encryption algorithms for applications and to receive applications comprising at least one member of the group consisting of:
      vehicle-to-vehicle communication;
      vehicle-to-infrastructure communication;
      operating software; and
      component software.

8. The data transfer, power supply and charging apparatus as claimed in claim 1, wherein the energy storage device of the vehicle has a data memory configured to be read externally when the energy storage device is removed from the vehicle.

9. A method for transferring data to a vehicle and for charging an energy storage device of the vehicle, comprising the following steps:

connecting an electric line to a data interface for data transfer and for charging an energy storage device of the vehicle;

starting a charging process for the energy storage device and simultaneously transferring data via the electric line to a control apparatus of the vehicle, wherein the data include at least one member of the group consisting of internal vehicle software updates and entertainment data; and storing the transferred data on a memory element of the vehicle.

10. The method as claimed in claim 9, further comprising the steps of verifying prior to the data transfer whether it is necessary to update the data;

forwarding information of an incomplete data transfer from the external data transfer and charging station to a data provider for supplying the data to the vehicle via at least one wireless communication network during travel; and configuring information about the stored data for display on a vehicle display device.

11. A non-transitory computer-readable medium storing an executable program which, when executed on a processor, instructs the processor to perform the method as claimed in claim 9.

* * * * *